(12) United States Patent
Block et al.

(10) Patent No.: US 6,951,637 B2
(45) Date of Patent: Oct. 4, 2005

(54) METHOD AND DEVICE FOR PRODUCING GLOBULAR GRAINS OF HIGH-PUROTY SILICON HAVING A DIAMETER OF BETWEEN 50 μM AND 300 μM AND USE OF THE SAME

(75) Inventors: Hans-Dieter Block, Leverkusen (DE); Udo Kräuter, Leverkusen (DE); Peter Schreckenberg, Bremen (DE)

(73) Assignee: SolarWorld Aktiengesellschaft, Bonn (DE)

(*) Notice: Subject to any disclaimer, the term of this patent is extended or adjusted under 35 U.S.C. 154(b) by 0 days.

(21) Appl. No.: 10/433,257

(22) PCT Filed: Nov. 6, 2001

(86) PCT No.: PCT/EP01/12804
§ 371 (c)(1),
(2), (4) Date: May 29, 2003

(87) PCT Pub. No.: WO02/46097
PCT Pub. Date: Jun. 13, 2002

(65) Prior Publication Data
US 2004/0016392 A1 Jan. 29, 2004

(30) Foreign Application Priority Data
Nov. 30, 2000 (DE) .......................................... 100 59 594

(51) Int. Cl.$^7$ ......................... C01B 33/02; B22D 11/01; B22F 9/00; B28B 1/54; B29B 9/00
(52) U.S. Cl. ...................... 423/348; 425/7; 425/174.2; 239/86; 239/102.2
(58) Field of Search ................................ 425/6, 7, 174, 425/174.2; 239/79, 81, 82, 86, 102.1, 128, 102.2, 135, 302, 379, 569; 423/348

(56) References Cited

U.S. PATENT DOCUMENTS 3,200,873 A * 8/1965 O'Connor et al. ............ 431/73
3,255,804 A * 6/1966 Lang ........................... 431/62

(Continued)

FOREIGN PATENT DOCUMENTS

| DE | 33 42 496 | 6/1985 |
| DE | 26 56 330 | 3/1989 |
| DE | 42 40 749 | 9/1993 |
| DE | 195 29 518 | 2/1996 |
| DE | 195 34 232 | 3/1997 |
| DE | 195 41 539 | 5/1997 |
| EP | 0 308 933 | 3/1989 |
| JP | 58-145611 | 8/1983 |
| JP | 6 14 822 A | 5/1994 |
| WO | WO 98/07520 | 2/1998 |

*Primary Examiner*—Colleen P. Cooke
(74) *Attorney, Agent, or Firm*—McGlew and Tuttle, P.C.

(57) ABSTRACT

The invention relates to a method and a device for producing globular grains of high-purity silicon by atomising a silicon melt (6) in an ultrasonic field (10). Globular grains having a grain size of 50 μm can be produced by means of said method and device and can be used to separate high-purity silicon from silane in the fluid bed. The silicon melt (6) is fed into the ultrasonic field (10) at a distance of <50 mm in relation to a field node, and the atomised silicon leaves the ultrasonic field (10) at a temperature close to the liquidus point. The invention also relates to a use of the product produced according to the inventive method or using the inventive device, as particles for producing high-purity silicon from silane in a fluid bed.

33 Claims, 1 Drawing Sheet

U.S. PATENT DOCUMENTS

| | | | |
|---|---|---|---|
| 3,397,258 A | * 8/1968 | Williams | 264/9 |
| 4,233,007 A | * 11/1980 | Karlsson | 425/7 |
| 4,424,199 A | 1/1984 | Iya | |
| 4,565,913 A | 1/1986 | Yatsurugi et al. | |
| 4,626,278 A | * 12/1986 | Kenney et al. | 75/338 |
| 4,648,820 A | * 3/1987 | Scruggs et al. | 425/8 |
| 4,691,866 A | 9/1987 | Belk | |
| 4,818,495 A | 4/1989 | Iya | |
| 4,825,647 A | * 5/1989 | Cann | 60/203.1 |
| 4,883,687 A | 11/1989 | Gautreaux et al. | |
| 4,981,425 A | * 1/1991 | Lierke et al. | 425/6 |
| 5,110,335 A | * 5/1992 | Miller et al. | 65/425 |
| 5,164,198 A | * 11/1992 | Bauckhage et al. | 425/6 |
| 5,198,157 A | * 3/1993 | Bechet | 264/9 |
| 5,269,980 A | * 12/1993 | Levendis et al. | 264/9 |
| 5,461,089 A | * 10/1995 | Handyside et al. | 523/171 |
| 5,480,470 A | * 1/1996 | Miller et al. | 75/338 |
| 5,766,342 A | * 6/1998 | Shibuya et al. | 117/54 |
| 6,213,356 B1 | * 4/2001 | Nakasu et al. | 222/590 |

* cited by examiner

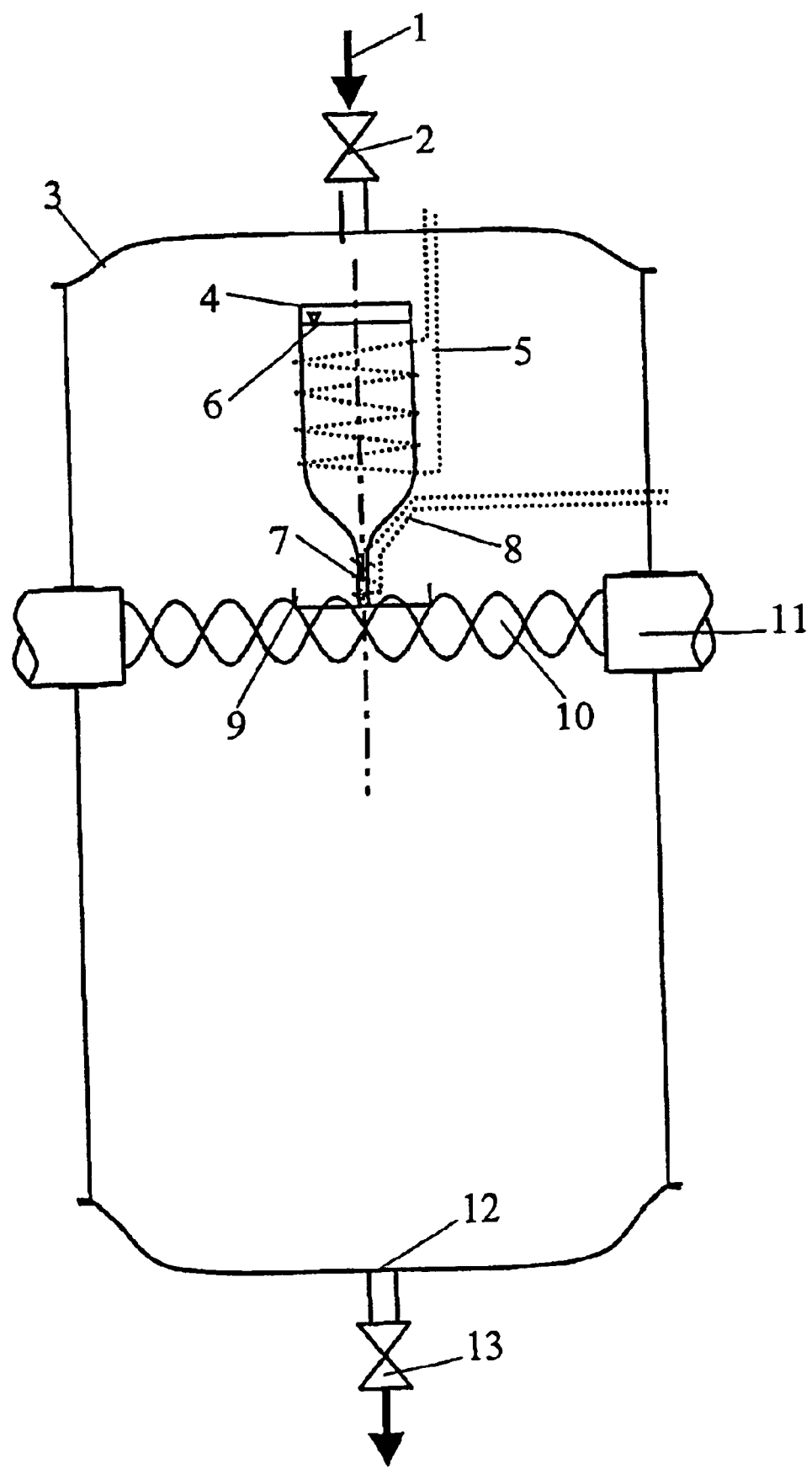

METHOD AND DEVICE FOR PRODUCING GLOBULAR GRAINS OF HIGH-PUROTY SILICON HAVING A DIAMETER OF BETWEEN 50 µM AND 300 µM AND USE OF THE SAME

The present invention relates to a method and a device for producing globular grains of high-purity silicon having a diameter of between 50 µm and 300 µm as well as to the use of the same as seed to separate high-purity silicon from silane in a fluid bed.

Thermal degradation of silane ($SiH_4$) on high-purity silicon seed grains in a fluid bed has proven as a particularly favourable method for producing high-purity silicon. In this process, the separated silicon grows on the seed grains thus enlarging the latter. This process may be performed on a per-arrangement or continuous basis wherein the number of discharged final product particles has to be compensated for by feeding new high-purity silicon seed particles. In most cases, the desired final product of the silane degradation process consists of high-purity silicon grains having a grain size of between 0.3 mm and 3 mm, as this size range is particularly suitable for dosing and melting. As a consequence, the seed particles used should be of a size less than 0.3 mm, preferably up to one order of magnitude less than the diameter of the desired final product, on the one hand in order to achieve a final product: seed particles ratio as favourable as possible (i.e. as large as possible), and on the other hand in order to keep the fine-grain discharge from the fluid bed small. Thus, a size range of the seed particles between 50 µm and 300 µm should be aimed at.

Such seed particles can be obtained, for example, by milling, particularly by breaking or crushing, of high-purity silicon of any shape and origin to achieve the size required. Patent documents describe various methods for mechanically milling high-purity silicon:

Methods for milling high-purity silicon in jet mills are known in the art (DE 42 40 749 A1, U.S. Pat. No. 4,424, 199). These methods ensure a high purity level of the final product. However, the milling result is very unspecific so that a large percentage of particle material being smaller than the desired lower limit of 50 µm is produced. This material cannot be further utilised and thus is lost.

Further, the milling of high-purity silicon in a cylinder mill is known in the art. Among the mechanical milling devices, the cylinder mill is best suited to perform the task. The product's particle size range can be adjusted very precisely to match the targeted size. However, there exists the problem of pollution of the final product caused by metal particles abraded off the mill surface. Expensive purification techniques are required (DE 195 29 518 A1, JP 6-144 822-A) to remove the abraded metal particles from the silicon. As an alternative, JP 58-145 611-A describes a mill using a silicon roller. The drawback of this construction is that the brittleness of the silicon roller impairs the technical availability of the facility.

Patent documents also describe various other methods for producing seed particles: bombardment of a high-purity silicon target with silicon particles (U.S. Pat. No. 4,691, 866), microwave comminution of high-purity silicon bars (U.S. Pat. No. 4,565,913), electromechanical comminution of silicon bars (DE 195 41 539 A1), comminution by means of electric discharging (WO 98/07520, DE 195 34 232 A1). A drawback of all these methods is that they comminute very unspecifically resulting in considerable quantities of useless fine particles.

Apart from milling high-purity silicon, the atomisation of a high-purity silicon melt is also a feasible way to obtain small high-purity silicon particles. However, the usual method of atomising a high-purity silicon melt which is drained off a nozzle by lateral gas jetting is uneconomical because very long cooling lines are required. These require very large dimensions of the equipment which on the one hand cause high investment cost while their adaptation to the relevant purity requirements is very expensive.

It is therefore an object of the present invention to provide a method and a device for producing seed particles of appropriate size allowing, without the risk of intrusion of undesired impurities and without undue loss of substance, the production of seed particles consisting of high-purity silicon of any origin and size distribution.

To this end, a method is suggested wherein the melt is fed in the ultrasonic field above a field node, with the atomised silicon leaving the ultrasonic field at a temperature near the liquefaction point so that the solidified globular grains essentially adopt a grain size of between 50 µm and 300 µm.

According to the present invention, it is possible to produce such high-purity silicon particles by melting and atomising in an ultrasonic field without contact with foreign matter implying strong mechanical forces and without a remarkable percentage of particles of undesired and useless sizes.

The atomisation of a jet of a liquid substance, preferably a molten metal wherein said jet penetrates an ultrasonic field, in particular said jet being led through a compressed gaseous medium in the ultrasonic field, is known in the art (DE 37 35 787 C2). However, this known method produces globular grains in a size range of 0.1 µm and less. Further, the state-of-the-art devices fail to meet the purity level required for the high-purity silicon particles.

The method according to the present invention using the metalloid silicon allows the production of particles having a size of between 50 µm and 300 µm. No relevant quantities of fine particles smaller than 50 µm occur. The particles are produced in globular shape at the desired purity level.

Preferably, high-purity gases such as hydrogen, rare gas (argon), or nitrogen, are used as inert gas. The gas pressure in the reaction chamber preferably amounts to at least 2 to 40 bar, most preferably 10 bar.

Finally, the scope of the present invention covers a utilisation of the product made in accordance with the method according to the present invention or using the device according to the present invention as seed particles for producing high-purity silicon from silane in a fluid bed, as the high-purity silicon particles delivered from the pressurised ultrasonic atomisation device can be used as such for this purpose without any subsequent treatment. These particles are characterised by globular shapes, a crystalline structure and high purity and thus are more suitable than known particles as seed particles in a high-purity silicon separation process. It is of course possible to further classify or limit otherwise the grain size before their utilisation.

Hereinafter the present invention will be described in more detail with reference to a drawing representing a preferred example embodiment. The only figure schematically shows the structure of a device according to the present invention.

Silicon 1 is fed by a suitable feeding device, in the example a solid matter valve 2, continuously or intermittently into a melting pot 4 arranged in a pressure vessel 3. Said solid matter valve 2 and the feeding lines (not shown in detail) are designed so that no contamination of the silicon 1 can occur. In said melting pot 4, which consists preferably of graphite or silicon carbide (SiC) or is provided with a quartz glass liner, the silicon 1 is melted by means of a heating means 5. The pressure above the melting surface is at least equal to the pressure inside the pressure vessel 3 and ranges preferably between 2 and 40 bar.

The pressure vessel 3 is filled with high-purity gas, preferably hydrogen, rare gas (argon) or nitrogen in order to prevent a contamination of the silicon. The now molten silicon 6 flows through a capillary tube 7 out of said melting pot 4. Said capillary tube 7 consists preferably of graphite or SiC and is kept at a temperature above the melting temperature of the silicon by a heating means 8. The heating spiral of said heating means 8 is provided with a heat shield 9. Said heat shield 9 consists of a material not causing any impurities in the silicon, preferably of graphite or SiC. Said heating means 8 protects said capillary tube 7 from freezing, said heat shield 9 reduces the cooling by the ultrasonic field 10 and prevents any contact between melt drops and heating spiral.

The melting stream flowing out of said capillary tube 7 flows directly into a field node of said ultrasonic field 10. At this point, said melt 6 is atomised. Said ultrasonic field 10 is generated by preferably two sonotrodes 11 being arranged diametrically opposite to each other when said pressure vessel 3 is in use. The sonic frequency ranges between 5 and 30 kHz, preferably 20 kHz. Said sonotrodes 11 are resonance-operated. The distance of said sonotrodes 11 should be chosen so wide that the melt drops cannot contact said sonotrodes 11 in their liquid state; the distance should preferably exceed nine field nodes. In order to avoid contamination by the sonotrodes 11, it is possible to coat them, preferably with SiC. The atomised silicon cools down very quickly in the ultrasonic field 10. The dimensions of said pressure vessel 3 are chosen so that the atomised silicon does not reach the walls of said vessel until the atomised silicon has reached its solid state.

In order to avoid contamination of the silicon due to contact with the jacket of said pressurised vessel 3, the walls are shielded by liners made of graphite or quartz glass or an appropriate coating such as SiC or equivalent linings. The bottom of said pressure vessel 3 is designed so that the silicon particles enter a discharge channel 12. The silicon particles are continuously or intermittently discharged from said pressure vessel 3 via discharge means 13, a suitable valve or a cellular wheel sluice.

The device according to the present invention differs from the construction disclosed in DE 37 35 787 C2 in that the discharge opening for the melt stream (tip of said capillary tube 7) may be positioned very close, preferably <50 mm, to the central field node of said ultrasonic field 10. As mentioned, this requires the additional heating device 8 of said capillary tube 7 and the heat shield 9 made of graphite. Lateral gas jetting towards the melt stream is abandoned. The atomised silicon leaves the ultrasonic field 10 at a temperature near the liquefaction point. Said sonotrodes 11 must be mounted at a very long distance from each other, preferably longer than nine field nodes. In order to avoid contamination of the silicon, said sonotrodes 11 may be coated with SiC. The atomised silicon is significantly coarser than the material produced according to the state of the art.

What is claimed is:

1. A device for producing globular grains of high-purity silicon by atomizing a silicon melt in an ultrasonic field inside a pressurized vessel filled with inert gas, said device comprising:

said vessel containing a heated melting pot for melting said silicon and a set of sonotrodes for producing a sonic field, wherein the melt is fed into said ultrasonic field through a capillary tube, that the heated portion said capillary tube is heat-insulated from said ultrasonic field by a heat shield, and all surfaces which might come into contact with the globular grains in said pressurized vessel comprise at least one of a non-contaminating material, a coating with a liner made of a non-contaminating material and a coating with a non-contaminating material.

2. A device according to claim 1, wherein said ultrasonic field is generated by at least two sonotrodes being arranged at a minimum distance of nine field nodes between each other.

3. A device according to claim 1, wherein said capillary tube has a maximum distance of 50 mm from one field node of said ultrasonic field.

4. A device according to claim 1, wherein said capillary tube is provided with an additional heating means.

5. A device according to claim 1, wherein the distance from a set of walls of said pressurized vessel to an atomisation zone for atomizing said silicon melt is chosen so that the globular grains are completely solidified before the globular grains hit said walls.

6. A device according to claim 1, wherein at least one of graphite, silicon carbide and quartz glass are used as said non-contaminating material.

7. A device according to claim 1, wherein the silicon is fed into said heated melting pot via a solid matter valve.

8. A device according to claim 1, wherein the bottom of said pressurized vessel is provided with a discharge means for discharging the high-purity silicon.

9. A device according to claim 8, wherein a cellular wheel sluice is provided as said discharge means.

10. A device for producing globular grains of high-purity silicon by atomizing a silicon melt in an ultrasonic field inside a pressurized vessel filled with inert gas, comprising:

said vessel containing a heated melting pot for melting said silicon and at least two sonotrodes for producing the ultrasonic field;

a capillary tube connected to said heated melting pot for feeding the melt into said ultrasonic field, wherein the ultrasonic field is generated by said sonotrodes being arranged at a minimum distance of nine field nodes between each other;

a heat shield adjacent said capillary tube, said heat shield insulating said capillary tube from the ultrasonic field; and all surfaces in said pressurized vessel coming in contact with the globular grains comprise at least one of a non-contaminating material, a coating with a liner made of a non-contaminating material and a coating with a non-contaminating material.

11. A device according to claim 10, wherein said capillary tube has a maximum distance of 50 mm from one field node of said ultrasonic field.

12. A device according to claim 10, wherein said capillary tube is provided with a heating means.

13. A device according to claim 10, wherein the distance from the walls of said pressurized vessel to an atomization zone for atomizing said silicon melt is chosen so that the globular grains are completely solidified before the globular grains hit said walls.

14. A device according to claim 10, wherein at least one of graphite, silicon carbide and quartz glass are used as said non-contaminating material.

15. A device according to claim 10, wherein the silicon is fed into said heated melting pot via a solid matter valve.

16. A device according to claim 10, wherein the bottom of said pressurized vessel is provided with a discharge means for discharging the high-purity silicon.

17. A device according to claim 16, wherein a cellular wheel sluice is provided as said discharge means.

18. A device for producing globular grains of high-purity silicon by atomizing a silicon melt in a sonic field inside a pressurized vessel filled with inert gas, comprising:

said pressurized vessel;

a heated melting pot inside said pressurized vessel for melting a silicon material into the silicon melt;

a capillary tube providing a continuous path from said heated melting pot for the silicon melt;

a set of sonotrodes for producing the ultrasonic field underneath a bottom of said capillary tube, wherein said capillary tube feeds the silicon melt into said ultrasonic field, and said capillary tube has a maximum distance of 50 mm from one field node of said sonic field;

a heat shield adjacent said bottom to insulate said capillary tube from said ultrasonic field; and all surfaces in said pressurized vessel coming in contact with the globular grains comprise at least one of a non-contaminating material, a coating with a liner made of a non-contaminating material and a coating with a non-contaminating material.

19. A device according to claim 18, wherein said ultrasonic field is generated by at least two sonotrodes being arranged at a minimum distance of nine field nodes between each other.

20. A device according to claim 18, wherein said capillary tube is provided with heating means.

21. A device according to claim 18, wherein the distance from the walls of said pressurized vessel to an atomisation zone for atomizing said silicon melt is chosen so that the globular grains are completely solidified before the globular grains hit said walls.

22. A device according to claim 18, wherein at least one of graphite, silicon carbide and quartz glass are used as said non-contaminating material.

23. A device according to claim 18, wherein the silicon is fed into said heated melting pot via a solid matter valve.

24. A device according to claim 18, wherein the bottom of said pressurized vessel is provided with a discharge means for discharging the high-purity silicon.

25. A device according to claim 24, wherein a cellular wheel sluice is provided as said discharge means.

26. A device for producing globular grains of high-purity silicon by atomizing a silicon melt in an ultrasonic field inside a pressurized vessel filled with inert gas, the device comprising:

said vessel;

a heated melting pot inside said vessel for melting a silicon material;

a set sonotrodes underneath said heated melting pot for producing a sonic field;

a capillary tube between said heated melting pot and said sonic field, wherein said capillary tube is provided with a heating means, and the silicon melt is fed into the ultrasonic field through said capillary tube;

a heat shield heat-insulating said capillary tube from said ultrasonic field; and all surfaces coming in contact with the globular grains in said pressurized vessel comprising a non-contaminating material.

27. A device according to claim 26, wherein said ultrasonic field is generated by at least two sonotrodes being arranged at a minimum distance of nine field nodes between each other.

28. A device according to claim 26, wherein said capillary tube has a maximum distance of 50 mm from one yield node of said ultrasonic field.

29. A device according to claim 26, wherein the distance from the walls of said pressurized vessel to an atomisation zone for atomizing said silicon melt is chosen so that the globular grains are completely solidified before the globular grains hit said walls.

30. A device according to claim 26, wherein at least one of graphite, silicon carbide and quartz glass are used as said non-contaminating material.

31. A device according to claim 26, wherein the silicon is fed into said heated melting pot via a solid matter valve.

32. A device according to claim 26, wherein the bottom of said pressurized vessel is provided with a discharge means for discharging the high-purity silicon.

33. A device according to claim 32, wherein a cellular wheel sluice is provided as said discharge means.

\* \* \* \* \*